US012744261B2

(12) United States Patent
Nishikawa et al.

(10) Patent No.: US 12,744,261 B2
(45) Date of Patent: Sep. 22, 2026

(54) METHOD FOR RECOVERING LITHIUM AND METHOD FOR PROCESSING LITHIUM ION SECONDARY BATTERY

(71) Applicant: DOWA ECO-SYSTEM CO., LTD., Tokyo (JP)

(72) Inventors: Chihiro Nishikawa, Tokyo (JP); Yoshihiro Honma, Tokyo (JP); Ryoei Watanabe, Tokyo (JP); Masataka Yamashita, Tokyo (JP); Yoshiki Ito, Tokyo (JP); Yoshitaka Yoshiwara, Tokyo (JP)

(73) Assignee: DOWA ECO-SYSTEM CO., LTD., Tokyo (JP)

( * ) Notice: Subject to any disclaimer, the term of this patent is extended or adjusted under 35 U.S.C. 154(b) by 983 days.

(21) Appl. No.: 17/910,214

(22) PCT Filed: Mar. 9, 2021

(86) PCT No.: PCT/JP2021/009223

§ 371 (c)(1),
(2) Date: Sep. 8, 2022

(87) PCT Pub. No.: WO2021/182452

PCT Pub. Date: Sep. 16, 2021

(65) Prior Publication Data

US 2023/0104457 A1 Apr. 6, 2023

(30) Foreign Application Priority Data

Mar. 13, 2020 (JP) ................................ 2020-043902
Mar. 4, 2021 (JP) ................................ 2021-034103

(51) Int. Cl.
*H01M 10/54* (2006.01)
*B09B 3/35* (2022.01)
(Continued)

(52) U.S. Cl.
CPC ............... *H01M 10/54* (2013.01); *B09B 3/35* (2022.01); *B09B 3/70* (2022.01); *C22B 1/16* (2013.01);
(Continued)

(58) Field of Classification Search
None
See application file for complete search history.

(56) References Cited

U.S. PATENT DOCUMENTS

2004/0028585 A1 2/2004 Cardarelli et al.
2019/0386354 A1 12/2019 Muraoka et al.

FOREIGN PATENT DOCUMENTS

CN 109037722 A 12/2018
CN 110203949 A 9/2019
(Continued)

OTHER PUBLICATIONS

Matsumura et al., "Events that occur in a safety assessment test for lithium ion secondary batteries", Brief summary of lectures at National Traffic Safety and Environment Laboratory Forum, 2012, pp. 135-138.

(Continued)

*Primary Examiner* — Yun Qian
(74) *Attorney, Agent, or Firm* — Greenblum & Bernstein, P.L.C.

(57) ABSTRACT

Provided is a method for recovering lithium, for recovering lithium from a lithium ion secondary battery, the method including: a thermal treatment step of thermally treating a lithium ion secondary battery having a residual voltage higher than or equal to 80% of a rated voltage, to obtain a thermally treated product; a pulverizing step of pulverizing the thermally treated product, to obtain a pulverized product; and a lithium recovering step of recovering lithium from the pulverized product.

10 Claims, 1 Drawing Sheet

(51) Int. Cl.

| | |
|---|---|
| ***B09B 3/70*** | (2022.01) |
| ***C22B 1/16*** | (2006.01) |
| ***C22B 3/04*** | (2006.01) |
| ***C22B 3/22*** | (2006.01) |
| ***C22B 7/00*** | (2006.01) |
| ***C22B 21/00*** | (2006.01) |
| ***C22B 26/12*** | (2006.01) |

(52) U.S. Cl.

CPC .................. *C22B 3/04* (2013.01); *C22B 3/22* (2013.01); *C22B 7/003* (2013.01); *C22B 7/006* (2013.01); *C22B 21/0092* (2013.01); *C22B 26/12* (2013.01)

(56) References Cited

FOREIGN PATENT DOCUMENTS

| | | | |
|---|---|---|---|
| CN | 110923453 | A | 3/2020 |
| CN | 111430831 | A | 7/2020 |
| JP | 11-167936 | A | 6/1999 |
| JP | 2011-124127 | A | 6/2011 |
| JP | 2013-187142 | A | 9/2013 |
| JP | 2017-037807 | A | 2/2017 |
| JP | 6198027 | B1 | 9/2017 |
| JP | 2018-145473 | A | 9/2018 |

OTHER PUBLICATIONS

International Search Report and Written Opinion of the International Searching Authority issued in International Patent Application No. PCT/JP2021/009223, dated May 25, 2021, along with an English translation thereof.

First Notice of Reasons for Refusal issued in Japanese Counterpart Patent Application No. 2021-034103, mailed May 18, 2021, along with an English translation thereof.

Second Notice of Reasons for Refusal issued in Japanese Counterpart Patent Application No. 2021-034103, mailed Aug. 31, 2021, along with an English translation thereof.

Extended European Search report that issued in corresponding European Patent Application No. 21768111.3, dated Mar. 22, 2024.

Rouhi et al., “Voltage behavior in lithium-ion batteries after electrochemical discharge and its implications on the safety of recycling processes”, Journal of Energy Storage, vol. 35 (2021), 102323, pp. 1-7.

Office Action mailed on Aug. 12, 2025, in corresponding Korean patent application No. 10-2022-7031918, along with English translation thereof.

Office Action mailed on Jan. 29, 2026, in corresponding Chinese Patent Application No. 202180034027.0, along with English translation thereof.

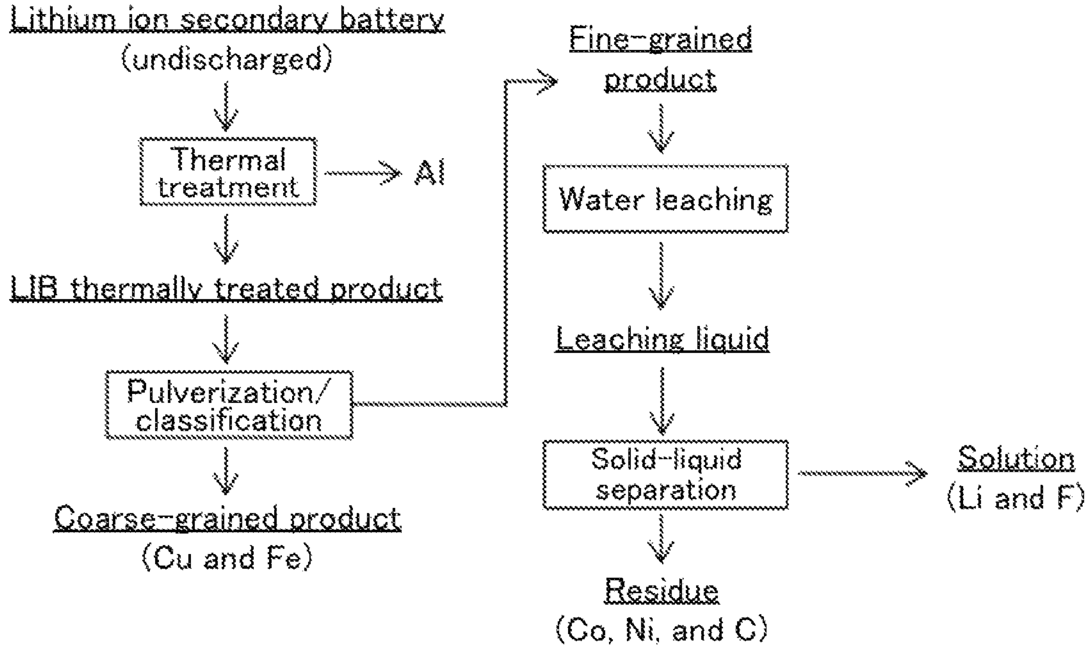
Lithium ion secondary battery
(undischarged)
Thermal treatment
Al
LIB thermally treated product
Pulverization/ classification
Coarse-grained product
(Cu and Fe)
Fine-grained product
Water leaching
Leaching liquid
Solid-liquid separation
Solution
(Li and F)
Residue
(Co, Ni, and C)

METHOD FOR RECOVERING LITHIUM AND METHOD FOR PROCESSING LITHIUM ION SECONDARY BATTERY

TECHNICAL FIELD

The present invention relates to a method for recovering lithium from a lithium ion secondary battery and a method for processing a lithium ion secondary battery.

BACKGROUND ART

Lithium ion secondary batteries have a lighter weight, a higher capacity, and a higher electromotive force than those of existing lead-acid batteries and NiCd secondary batteries, and are used as secondary batteries of, for example, personal computers, electric vehicles, and portable devices. For example, valuable substances such as cobalt and nickel are used in the positive electrodes of lithium ion secondary batteries in the form of, for example, lithium cobaltate ($LiCoO_2$) and a ternary system positive electrode material ($LiNi_xCo_yMn_zO_2$ (x+y+z=1)).

Lithium ion secondary batteries are expected to continue to become more widespread in use. Therefore, in terms of resource recycling, it is desirable to recover valuable substances such as lithium from defective products generated in the production process or from lithium ion secondary batteries discarded due to, for example, expired life of both of the devices in which they are used and batteries. When recovering valuable substances such as lithium from lithium ion secondary batteries, it is important to recover the valuable substances by separating various metals and impurities used in the lithium ion secondary batteries from the valuable substances in order to increase the value of the recovered products.

A technique proposed as a technique for recovering valuable substances from lithium ion secondary batteries recovers valuable substances such as copper foils, aluminum foils, active substance components, and metal members by subjecting used lithium ion secondary batteries to a discharging step, and subjecting the discharged lithium ion secondary batteries to a thermal decomposition step, a pulverizing step, a sieving step, a wind force sorting step, and a magnetic sorting step (for example, see PTL 1).

Because of, for example, safety problems, existing techniques as described above naturally assume discharged lithium ion secondary batteries as their target of thermal treatment or valuable substance sorting. Hence, processing lithium ion secondary batteries having a residual voltage has not been the existing techniques' subject of study in the first place, and has not been studied at all.

There are various studies into the technique for recovering lithium from lithium ion secondary batteries. However, there is a limit to improving the recovery rate of lithium according to the existing techniques, and it has been extremely difficult to find out a method that can better increase the recovery rate of lithium.

Moreover, since lithium ion secondary batteries are expected to continue to become more widespread in use as described above, it is considered that the amount of waste lithium ion secondary batteries to be generated will also increase.

Before recovering valuable substances such as lithium from a large quantity of lithium ion secondary batteries, existing techniques have problems that a step of discharging batteries is necessary, and that energy consumption in the thermal treatment step is high. Furthermore, a method for improving the purity of lithium to be recovered has been demanded.

Accordingly, it is demanded to do without discharging lithium ion secondary batteries to be discarded and to cut the energy costs for the thermal treatment step. In order to realize such a method, a method that can safely and easily process lithium ion secondary batteries having a residual voltage is necessary.

CITATION LIST

Patent Literature

PTL 1: Japanese Patent (JP-B) No. 6198027

SUMMARY OF INVENTION

Technical Problem

The present invention aims for solving the various problems in the related art and achieving an object described below.

That is, the present invention has an object to provide a method for recovering lithium and a method for processing a lithium ion secondary battery, the methods being able to do without discharging lithium ion secondary batteries and to cut the energy costs in the thermal treatment step.

Solution to Problem

Means for solving the above problems are as follows.

<1> A method for recovering lithium, for recovering lithium from a lithium ion secondary battery, the method including:
- a thermal treatment step of thermally treating a lithium ion secondary battery having a residual voltage higher than or equal to 80% of a rated voltage, to obtain a thermally treated product;
- a pulverizing step of pulverizing the thermally treated product, to obtain a pulverized product; and
- a lithium recovering step of recovering lithium from the pulverized product.

<2> The method for recovering lithium according to <1>, wherein the thermal treatment step includes a process of heating the lithium ion secondary battery to 350° C. or higher and 550° C. or lower.

<3> The method for recovering lithium according to <2>, wherein in the thermal treatment step, an amount of heat supply when the lithium ion secondary battery is igniting is changed to lower than or equal to 50% of an amount of heat supply before the lithium ion secondary battery ignites.

<4> The method for recovering lithium according to <2> to <3>, wherein in the thermal treatment step, after the lithium ion secondary battery finishes self-igniting, the lithium ion secondary battery is further thermally treated at 750° C. or higher and lower than 1,085° C.

<5> The method for recovering lithium according to any one of <1> to <4>, wherein in the thermal treatment step, the lithium ion secondary battery is thermally treated while being placed in a storing container.

<6> The method for recovering lithium according to <5>, wherein the storing container includes an opening through which a gas is circulatable.

<7> The method for recovering lithium according to <5> or <6>, wherein the storing container includes an openable and closable lid for storing the lithium ion secondary battery.

<8> The method for recovering lithium according to any one of <5> to <7>, wherein a melting point of the storing container is higher than a temperature at which the lithium ion secondary battery is thermally treated.

<9> The method for recovering lithium according to any one of <5> to <8>, wherein in the thermal treatment step, the lithium ion secondary battery is thermally treated in a manner that a flame for thermally treating the lithium ion secondary battery does not contact the storing container.

<10> The method for recovering lithium according to <9>, wherein in the thermal treatment step, the lithium ion secondary battery is thermally treated in a manner that the flame for thermally treating the lithium ion secondary battery is not radiated in a direction toward the storing container.

<11> The method for recovering lithium according to any one of <1> to <10>, including after the pulverizing step, a classifying step of classifying the pulverized product, to obtain a coarse-grained product and a fine-grained product, wherein in the lithium recovering step, lithium is recovered from the fine-grained product.

<12> The method for recovering lithium according to any one of <1> to <11>, wherein in the lithium recovering step, the pulverized product is immersed in water, to obtain a leaching liquid containing lithium.

<13> The method for recovering lithium according to <12>, wherein in the lithium recovering step, the leaching liquid is filtrated, to perform solid-liquid separation of the leaching liquid into a solution containing lithium, and a residue.

<14> The method for recovering lithium according to <12>, wherein in the lithium recovering step, the leaching liquid is subjected to wet magnetic sorting, to sort the leaching liquid into a slurry containing lithium and non-magnetically attractable materials, and magnetically attractable materials containing either or both of cobalt and nickel.

<15> The method for recovering lithium according to <14>, wherein in the lithium recovering step, the slurry is filtrated, to perform solid-liquid separation of the slurry into a solution containing lithium, and a residue containing the non-magnetically attractable materials.

<16> The method for recovering lithium according to <15>, wherein in the lithium recovering step, calcium hydroxide is added to the solution in order that fluorine contained in the solution is solidified in the form of calcium fluoride, and the solution is subsequently filtrated to perform solid-liquid separation, to remove fluorine from the solution.

<17> The method for recovering lithium according to <16>, wherein in the lithium recovering step, carbon dioxide is added to the solution from which fluorine has been removed in order that calcium contained in the solution is solidified in the form of calcium carbonate, and the solution is subsequently filtrated to perform solid-liquid separation, to remove calcium from the solution.

<18> The method for recovering lithium according to <17>, wherein in the lithium recovering step, the solution from which calcium has been removed is heated, to recover lithium carbonate.

<19> A method for processing a lithium ion secondary battery, the method including:

a thermal treatment step of thermally treating a lithium ion secondary battery having a residual voltage higher than or equal to 80% of a rated voltage, to obtain a thermally treated product.

<20> The method for processing a lithium ion secondary battery according to <19>, wherein the thermal treatment step includes a process of heating the lithium ion secondary battery to 350° C. or higher and 550° C. or lower.

<21> The method for processing a lithium ion secondary battery according to <20>, wherein in the thermal treatment step, an amount of heat supply when the lithium ion secondary battery is igniting is changed to lower than or equal to 50% of an amount of heat supply before the lithium ion secondary battery ignites.

<22> The method for processing a lithium ion secondary battery according to <20> or <21>, wherein in the thermal treatment step, after the lithium ion secondary battery finishes igniting, the lithium ion secondary battery is further thermally treated at 750° C. or higher and lower than 1,085° C.

<23> The method for processing a lithium ion secondary battery according to <22>, wherein the lithium ion secondary battery includes an exterior case containing aluminum, and in the thermal treatment step, the exterior case is melted, to recover aluminum.

<24> The method for processing a lithium ion secondary battery according to any one of <19> to <23>, wherein in the thermal treatment step, the lithium ion secondary battery is thermally treated while being placed in a storing container.

<25> The method for processing a lithium ion secondary battery according to <24>, wherein the storing container includes an opening through which a gas is circulatable.

<26> The method for processing a lithium ion secondary battery according to <24> or <25>, wherein the storing container includes an openable and closable lid for storing the lithium ion secondary battery.

<27> The method for processing a lithium ion secondary battery according to any one of <24> to <26>, wherein a melting point of the storing container is higher than a temperature at which the lithium ion secondary battery is thermally treated.

<28> The method for processing a lithium ion secondary battery according to any one of <24> to <27>, wherein in the thermal treatment step, the lithium ion secondary battery is thermally treated in a manner that a flame for thermally treating the lithium ion secondary battery does not contact the storing container.

<29> The method for processing a lithium ion secondary battery according to <28>,
wherein in the thermal treatment step, the lithium ion secondary battery is thermally treated in a manner that the flame for thermally treating the lithium ion secondary battery is not radiated in a direction toward the storing container.

<30> The method for processing a lithium ion secondary battery according to any one of <19> to <28>, further including:
a pulverizing step of pulverizing the thermally treated product, to obtain a pulverized product; and
a classifying step of classifying the pulverized product, to obtain a coarse-grained product and a fine-grained product.

<31> The method for processing a lithium ion secondary battery according to <30>,
wherein in the classifying step, copper is recovered into the coarse-grained product.

<32> The method for processing a lithium ion secondary battery according to <30> or <31>, further including
a leaching step of immersing the fine-grained product in water, to obtain a leaching liquid containing lithium.

<33> The method for processing a lithium ion secondary battery according to <32>, further including
subjecting the leaching liquid to wet magnetic sorting, to sort the leaching liquid into a slurry containing lithium and non-magnetically attractable materials, and magnetically attractable materials containing either or both of cobalt and nickel.

<34> The method for processing a lithium ion secondary battery according to any one of <19> to <33>,
wherein a percentage of nickel in a positive electrode active substance of the lithium ion secondary battery is 75% or greater.

Advantageous Effects of Invention

The present invention can provide a method for recovering lithium and a method for processing a lithium ion secondary battery, the methods being able to solve the various problems in the related art, to do without discharging lithium ion secondary batteries and to cut the energy costs in the thermal treatment step.

Moreover, the present invention can provide a method for recovering lithium, the method being able to recover lithium from a lithium ion secondary battery at a high recovery rate. In addition, the present invention can provide a method for processing a lithium ion secondary battery, the method being able to render a lithium ion secondary battery harmless (for example, discharge the lithium ion secondary battery and remove the electrolytic solution from the lithium ion secondary battery) by processing the lithium ion secondary battery safely, easily, at low Costs.

BRIEF DESCRIPTION OF DRAWINGS

FIG. 1 is a diagram illustrating an example of a flow of processes according to an embodiment of a method for recovering lithium of the present invention.

DESCRIPTION OF EMBODIMENTS (Method for Recovering Lithium and Method for Processing Lithium Ion Secondary Battery)

The method for recovering lithium of the present invention includes a thermal treatment step, a pulverizing step, and a lithium recovering step, preferably includes a classifying step, and further includes other steps as needed.

The method for processing a lithium ion secondary battery of the present invention includes a thermal treatment step, preferably includes a pulverizing step, a classifying step, a leaching step, and a wet magnetic sorting step, and further includes other steps as needed.

In the present invention, a lithium ion secondary battery having a residual voltage higher than or equal to 80% of a rated voltage is thermally treated.

The present inventors have earnestly studied a technique for recovering valuable substances such as lithium from lithium ion secondary batteries, and have found it possible to recover lithium from lithium ion secondary batteries regardless of the amount of the residual voltage in the lithium ion secondary batteries.

The present inventors have carried forward the studies, and have found it possible to improve the energy efficiency in a thermal treatment when the amount of the residual voltage in a lithium ion secondary battery is higher than or equal to a predetermined amount. The method for recovering lithium of the present invention is based on this finding.

Regarding a thermal treatment for lithium ion secondary batteries having residual voltages, for example, "Events that occur in a safety assessment test for lithium ion secondary batteries (Brief summary of lectures at National Traffic Safety and Environment Laboratory Forum, 135-138, 2012) (https://www.ntsel.go.jp/forum/2012files/pt_21.pdf)" says that "when a lithium ion battery is heated from the outside, the positive electrode material, the electrolytic solution, and the negative electrode material react solely and mutually to generate heat inside the battery". As can be known from this, when a lithium ion secondary battery having a residual voltage is heated, heat generation reactions occur in the lithium ion secondary battery, and the stored electric energy is converted to thermal energy and the lithium ion secondary battery generates heat from itself.

The method for recovering lithium of the present invention thermally treats a lithium ion secondary battery having a residual voltage higher than or equal to a predetermined level. Therefore, during the thermal treatment, there may be a case where heat generation reactions occur in the lithium ion secondary battery, the stored electric energy is converted to thermal energy, and the lithium ion secondary battery generates heat from itself.

Hence, according to one aspect, the method for recovering lithium of the present invention can perform a thermal treatment with less energy (thermal energy), that is, can make the heating temperature lower and can make the heating time shorter than by existing techniques.

The method for processing a lithium ion secondary battery of the present invention thermally treats a lithium ion secondary battery having a residual voltage higher than or equal to 80% of a rated voltage. More specifically, for example, the method for processing a lithium ion secondary battery of the present invention thermally treats a lithium ion secondary battery at a predetermined temperature (for example, 350° C. or higher and 550° C. or lower). In this way, the method for processing a lithium ion secondary battery of the present invention induces combustion (self-sustained combustion) and ignition of the lithium ion secondary battery by heat generation of the lithium ion secondary battery from itself.

As described above, when a lithium ion secondary battery having a residual voltage is heated, the lithium ion secondary battery generates heat from itself. Utilizing this heat generation, it is possible to make the lithium ion secondary battery burn by itself. Hence, the method for processing a lithium ion secondary battery of the present invention can thermally decompose a binder resin, the electrolytic solution, and the positive electrode active substance of the lithium ion secondary battery with greater energy saving than by existing techniques, and can facilitate recovery of valuable substances such as copper, aluminum, cobalt, and nickel from the lithium ion secondary battery. Decomposition of the positive electrode active substance facilitates dissolution of lithium in water.

Moreover, for example, the method for processing a lithium ion secondary battery of the present invention thermally treats a lithium ion secondary battery at a predetermined temperature, to thereby induce self-sustained combustion and ignition of the lithium ion secondary battery. This makes it possible to suppress thermal runaway of the lithium ion secondary battery and to process the lithium ion secondary battery utilizing the energy derived from the voltage of the lithium ion secondary battery. By processing the lithium ion secondary battery in this way, it is possible to deactivate the lithium ion secondary battery (e.g., discharge the lithium ion secondary battery and remove the electrolytic solution from the lithium ion secondary battery) stably while suppressing generation of, for example, a toxic gas, and to save the energy needed for the process.

In the following description, the method for recovering lithium of the present invention will be described first.

The method for recovering lithium of the present invention is a method for recovering lithium from a lithium ion secondary battery.

In the present invention, a substance other than lithium may be recovered. For example, a valuable substance that is contained in a lithium ion secondary battery and that is other than lithium may further be recovered.

A valuable substance represents a substance that can suffice as a transaction object without being discarded. Examples of the valuable substance include various metals. Examples of valuable substances in a lithium ion secondary battery include copper (Cu), aluminum (Al), cobalt (Co), and nickel (Ni).

—Lithium Ion Secondary Battery—

In the present invention, a lithium ion secondary battery is not particularly limited and may be appropriately selected in accordance with the intended purpose. Examples of the lithium ion secondary battery include defective lithium ion secondary batteries generated in the production process of lithium ion secondary batteries, lithium ion secondary batteries discarded due to, for example, defects of the devices in which they are used and expired life of the devices in which they are used, and used lithium ion secondary batteries discarded due to expired life.

For example, the shape, structure, size, and material of the lithium ion secondary battery are not particularly limited and may be appropriately selected in accordance with the intended purpose.

The shape of the lithium ion secondary battery is not particularly limited and may be appropriately selected in accordance with the intended purpose. Examples of the shape of the lithium ion secondary battery include a laminate shape, a cylindrical shape, a button shape, a coin shape, a square shape, and a flat shape.

The form of the lithium ion secondary battery is not particularly limited and may be appropriately selected in accordance with the intended purpose. Examples of the form of the lithium ion secondary battery include a battery cell, a battery module, and a battery pack. A battery module represents a product including a plurality of battery cells, which are unit cells, in one housing in a connected state. A battery pack represents a product including a plurality of battery modules in one housing. A battery pack may be equipped with, for example, a controller or a cooling device.

Examples of the lithium ion secondary battery include a lithium ion secondary battery including a positive electrode, a negative electrode, a separator, an electrolytic solution containing an electrolyte and an organic solvent, and an exterior container, which is a battery case in which the positive electrode, the negative electrode, the separator, and the electrolytic solution are contained. A lithium ion secondary battery from which, for example, a positive electrode or a negative electrode is lost may also be used.

——Positive Electrode——

The positive electrode is not particularly limited and may be appropriately selected in accordance with the intended purpose so long as the positive electrode contains a positive electrode active substance. For example, it is preferable that the positive electrode includes a positive electrode current collector.

The shape of the positive electrode is not particularly limited and may be appropriately selected in accordance with the intended purpose. Examples of the shape of the positive electrode include a flat plate shape and a sheet shape.

———Positive Electrode Current Collector———

The shape, structure, size, and material of the positive electrode current collector are not particularly limited and may be appropriately selected in accordance with the intended purpose.

Examples of the shape of the positive electrode current collector include a foil shape.

Examples of the material of the positive electrode current collector include stainless steel, nickel, aluminum, copper, titanium, and tantalum. Among these materials, aluminum is preferable.

A positive electrode material is not particularly limited and may be appropriately selected in accordance with the intended purpose. Examples of the positive electrode material include a positive electrode material that contains at least a positive electrode active substance containing lithium, and that contains a conducting agent and a binder resin as needed.

Examples of the positive electrode active substance include lithium manganate ($LiMn_2O_4$), lithium cobaltate ($LiCoO_2$), lithium cobalt-nickelate ($LiCo_{1/2}Ni_{1/2}O_2$), $LiNi_xCo_yMn_zO_2$ (x+y+z=1) referred to as a ternary system and an NCM system, $LiNi_xCo_yAl_z$ (x+y+z=1) referred to as an NCA system, lithium iron phosphate ($LiFePO_4$), and lithium titanate ($Li_2TiO_3$). Among these positive electrode active substances, lithium manganate, lithium cobaltate, lithium cobalt-nickelate ($LiCo_{1/2}Ni_{1/2}O_2$), $LiNi_xCo_yMn_zO_2$ (x+y+z=1) referred to as a ternary system and an NCM system, and $LiNi_xCo_yAl_z$ (x+y+z=1) referred to as an NCA system are preferable because lithium can easily transform to a water-soluble form through a thermal treatment.

The conducting agent is not particularly limited and may be appropriately selected in accordance with the intended purpose. Examples of the conducting agent include carbon black, graphite, carbon fiber, and metal carbides.

The binder resin is not particularly limited and may be appropriately selected in accordance with the intended purpose. Examples of the binder resin include homopolymers or copolymers of, for example, vinylidene fluoride, tetrafluoroethylene, acrylonitrile, and ethylene oxide, and styrene-butadiene rubbers.

——Negative Electrode——

The negative electrode is not particularly limited and may be appropriately selected in accordance with the intended purpose so long as the negative electrode contains a negative electrode active substance. For example, it is preferable that the negative electrode include a negative electrode current collector.

The shape of the negative electrode is not particularly limited and may be appropriately selected in accordance with the intended purpose. Examples of the shape of the negative electrode include a flat plate shape and a sheet shape.

———Negative Electrode Current Collector———

For example, the shape, structure, size, and material of the negative electrode current collector are not particularly limited and may be appropriately selected in accordance with the intended purpose.

Examples of the shape of the negative electrode current collector include a foil shape.

Examples of the material of the negative electrode current collector include stainless steel, nickel, aluminum, copper, titanium, and tantalum. Among these materials, copper is preferable.

The negative electrode active substance is not particularly limited and may be appropriately selected in accordance with the intended purpose. Examples of the negative electrode active substance include carbon materials such as graphite and hard carbon, silicon, and titanate.

Each step of the method for recovering lithium of the present invention will be described in detail below.

<Thermal Treatment Step>

The thermal treatment step is a step of thermally treating a lithium ion secondary battery having a residual voltage higher than or equal to 80% of a rated voltage, to obtain a thermally treated product.

A thermally treated product (roasted product) represents a product obtained by thermally treating a lithium ion secondary battery.

Through a thermal treatment of a lithium ion secondary battery having a residual voltage higher than or equal to a certain level, the electric energy in the battery is converted to thermal energy, the lithium ion secondary battery generates heat from itself, and lithium in $Li(Ni/Co/Mn)O_2$ contained in the positive electrode active substance or in $LiPF_6$ contained in the electrolyte forms lithium substances that can dissolve in an aqueous solution, such as lithium fluoride (LiF), lithium carbonate ($Li_2CO_3$), and lithium oxide ($Li_2O$).

A rated voltage of a lithium ion secondary battery represents a voltage (electromotive force) when the lithium ion secondary battery is used in a normal condition, and may be the voltage when the lithium ion secondary battery is used as a commercial product. That is, a rated voltage of a lithium ion secondary battery may be, for example, the voltage across terminals when a lithium ion secondary battery that has not deteriorated is used in a sufficiently charged state. More specifically, a rated voltage may be a nominal voltage of a lithium ion secondary battery.

In the present invention, when thermally treating a plurality of lithium ion secondary batteries collectively, all of the lithium ion secondary batteries may have residual voltages higher than or equal to 80% of the rated voltage, or some of the lithium ion secondary batteries may have residual voltages higher than or equal to 80% of the rated voltage. That is, in the present invention, when thermally treating a plurality of lithium ion secondary batteries collectively, it is only necessary that the lithium ion secondary batteries to be processed include at least one battery that has a residual voltage higher than or equal to 80% of the rated voltage.

The percentage of the number of lithium ion secondary batteries that have residual voltages higher than or equal to 80% of the rated voltage with respect to the total number of lithium ion secondary batteries to be thermally treated when thermally treating a plurality of lithium ion secondary batteries collectively is preferably 30% by number or greater and more preferably 60% by number or greater.

When thermally treating a lithium ion secondary battery pack or a lithium ion secondary battery module that is formed of a plurality of lithium ion secondary battery cells, the pack or the module on the whole may have a residual voltage higher than or equal to 80% of the rated voltage of the pack or the module, or all of the lithium ion secondary battery cells that constitute the pack or the module may have residual voltages higher than or equal to 80% of the rated voltage, or some lithium ion secondary battery cells that constitute the pack or the module may have residual voltages higher than or equal to 80% of the rated voltage.

That is, in the present invention, when thermally treating a lithium ion secondary battery pack or module, it is only necessary that the lithium ion secondary battery cells that constitute the pack or the module include at least one battery cell that has a residual voltage higher than or equal to 80% of the rated voltage.

The percentage of the number of lithium ion secondary battery cells that have residual voltages higher than or equal to 80% of the rated voltage with respect to the total number of lithium ion secondary battery cells included in the pack or the module when thermally treating a lithium ion secondary battery pack or module is preferably 30% by number or greater and more preferably 60% by number or greater.

The voltage (electromotive force) of a lithium ion secondary battery can be measured using, for example, a publicly known tester.

It is possible to ascertain the rated voltage of a lithium ion secondary battery by, for example, checking the voltage information written on the exterior package of the lithium ion secondary battery, by measuring the voltage of the lithium ion secondary battery in a fully charged state thereof with, for example, a tester when the lithium ion secondary battery is used as a product for the first time, or by inquiring of the lithium ion secondary battery manufacturer about the rated voltage.

The thermal treatment method in the thermal treatment step is not particularly limited and may be appropriately selected in accordance with the intended purpose. For example, it is possible to thermally treat a lithium ion secondary battery by heating the lithium ion secondary battery in a publicly known roasting furnace.

Examples of the roasting furnace include batch-type furnaces such as a rotary kiln, a fluidized bed furnace, a tunnel furnace, and a muffle, a cupola, a stoker furnace, and a pusher-type continuous furnace. Among these roasting furnaces, the batch-type furnaces and the pusher-type continuous furnace are preferable. It is also preferable to use a bath-type furnace and the pusher-type continuous furnace in combination.

<<Thermal Treatment Conditions>>

The conditions (thermal treatment conditions) for thermally treating (heating) a lithium ion secondary battery are not particularly limited and may be appropriately selected in accordance with the intended purpose, so long as the conditions enable the respective constituent components of the lithium ion secondary battery to be pulverized separately in a pulverizing step described below.

The atmosphere used in the thermal treatment is not particularly limited and may be appropriately selected in accordance with the intended purpose. Examples of the atmosphere include an atmospheric atmosphere, an inert atmosphere, a reducing atmosphere, and a hypoxic atmosphere.

The atmospheric atmosphere represents an atmosphere using air.

Examples of the inert atmosphere include an atmosphere formed of nitrogen or argon.

The reducing atmosphere represents an atmosphere in which an inert atmosphere such as nitrogen or argon contains, for example, CO, $H_2$, $H_2S$, and $SO_2$.

The hypoxic atmosphere represents an atmosphere in which an oxygen partial pressure is 11% or lower.

In the present invention, it is preferable to use the hypoxic atmosphere because it is possible to better improve the recovery rates and the grades of valuable substances (for example, aluminum) derived from the positive electrode current collector of the lithium ion secondary battery and valuable substances (for example, copper) derived from the negative electrode current collector of the lithium ion secondary battery.

In the present invention, it is preferable that the thermal treatment step include a process for heating a lithium ion secondary battery to 350° C. or higher and 550° C. or lower as described above. This makes it possible to suppress thermal runaway of the lithium ion secondary battery and to make the lithium ion secondary battery start ignition (self-sustained combustion) utilizing the energy derived from the voltage of the lithium ion secondary battery. This self-sustained combustion continues by short-circuiting (conversion of a voltage to thermal energy) across the positive electrode and the negative electrode along with fusion-cutting of the separator of the lithium ion secondary battery. This continued self-sustained combustion (conversion of a voltage to thermal energy and combustion of the electrolytic solution) can save the energy taken for the thermal treatment of the lithium ion secondary battery.

The self-sustained combustion is promoted along with decomposition of the electrode materials in the lithium ion secondary battery and release of oxygen, and provides more efficiency to solubilization of lithium, decomposition of a binder between copper and carbon, and metalation of cobalt and nickel (improvement in their magnetic attractability) in the lithium ion secondary battery than when the lithium ion secondary battery is heated using external heat outside the lithium ion secondary battery.

For adjustment of the thermal treatment temperature, a temperature reducing process by air blowing can be employed in addition to heating control.

The heating temperature in "the process for heating a lithium ion secondary battery to 350° C. or higher and 550° C. or lower" represents the surface temperature of the lithium ion secondary battery. When a lithium ion secondary battery is heated while being placed in a storing container, the surface temperature of the lithium ion secondary battery may be lower than the temperature in the furnace.

It is possible to measure or confirm the surface temperature of a lithium ion secondary battery by installing a thermocouple on the upper and lower surfaces of the lithium ion secondary battery and averaging the temperature measurements on both sides. The temperature in the furnace can be measured with a thermocouple installed on the wall surface of an exhaust gas outlet formed in an upper portion in the furnace.

The own temperature of a lithium ion secondary battery when the lithium ion secondary battery is igniting (for example, when the lithium ion secondary battery is burning (or having self-sustained combustion) by heat generation from itself) is preferably 700° C. or higher and 900° C. or lower and more preferably 700° C. or higher and 850° C. or lower. When the own temperature of the lithium ion secondary battery when it is having self-sustained combustion is 700° C. or higher, lithium in $Li(Ni/Co/Mn)O_2$ contained in the positive electrode active substance or in $LiPF_6$ contained in the electrolyte can transform to lithium substances that can dissolve in an aqueous solution, such as lithium fluoride (LiF), lithium carbonate ($Li_2CO_3$), and lithium oxide ($Li_2O$), and it is possible to separate lithium from impurities other than fluorine by leaching lithium.

When the own temperature of the lithium ion secondary battery when it is having self-sustained combustion is 700° C. or higher, thermal decomposition of, for example, lithium cobaltate and lithium nickelate contained as the positive electrode active substance, formation of metal particles of cobalt and nickel, and selective recovery of cobalt and nickel into magnetically attractable materials by magnetic sorting are facilitated, and thermal decomposition of a binder between copper and carbon in the negative electrode current collector and separation of carbon from copper are also facilitated. In addition, when the own temperature of the lithium ion secondary battery when it is having self-sustained combustion is 700° C. or higher, aluminum in the positive electrode current collector can be embrittled, and consequently can be removed into a fine-grained product by pulverization/classification and separated from copper, which is to be recovered into a coarse-grained product. By preventing the own temperature of the lithium ion secondary battery when it is having self-sustained combustion from exceeding 950° C., it is possible to suppress thermal runaway and to suppress a sharp decline in the oxygen concentration in the furnace and a consequent increase in the CO concentration in an exhaust gas (incomplete combustion).

It is possible to measure the own temperature of a lithium ion secondary battery by inserting a thermometer such as a thermocouple or a thermistor into the lithium ion secondary battery that is at the thermal treatment temperature.

The thermal treatment time (a time for which a lithium ion secondary battery is thermally treated) is not particularly limited, may be appropriately selected in accordance with the intended purpose, and may be a time in which ignition (self-sustained combustion) of the lithium ion secondary battery can be induced. The thermal treatment time is preferably 1 minute or longer and 5 hours or shorter, more preferably 1 minute or longer and 2 hours or shorter, and particularly preferably 1 minute or longer and 1 hour or shorter. The thermal treatment time needs at least to be a time taken until the lithium ion secondary battery reaches the thermal treatment temperature, and the retention time may be short. When the thermal treatment time is 1 minute or longer and 5 hours or shorter, there are advantages that the costs taken for the thermal treatment can be saved, and the thermal treatment efficiency can be improved.

In the thermal treatment step, for example, it is preferable to weaken heating of the lithium ion secondary battery after combustion (self-sustained combustion) of the lithium ion secondary battery by heat generation from itself is confirmed. This makes it possible to save the energy needed for the thermal treatment in particular, and to prevent thermal runaway of the lithium ion secondary battery in addition.

More specifically, for example, it is preferable to change the amount of heat supply when the lithium ion secondary battery is burning (igniting) by heat generation from itself to lower than or equal to 50% of the amount of heat supply before the lithium ion secondary battery burns by heat generation from itself. It is possible to control the amount of heat supply in the thermal treatment step by, for example, changing the amount of the fuel to be fed, or adjusting the amount of electricity.

In the present invention, ignition (self-sustained combustion) of the lithium ion secondary battery continues, and can thermally decompose a binder resin and the electrolytic solution of the lithium ion secondary battery sufficiently. Moreover, in this case, combustion of the lithium ion secondary battery continues even after heating of the lithium ion secondary battery in the thermal treatment is completed, and, for example, can sufficiently oxidize (embrittle) aluminum, which is an example of a valuable substance derived from the positive electrode current collector, and make aluminum more easily sortable from copper, which is an example of a valuable substance derived from the negative electrode current collector, making is possible to better improve the recovery rates and the grades of copper and aluminum. Moreover, the heat generation itself can transform lithium in $Li(Ni/Co/Mn)O_2$ contained in the positive electrode active substance or in $LiPF_6$ contained in the electrolyte to lithium substances that can dissolve in an aqueous solution, such as lithium fluoride (LiF), lithium carbonate ($Li_2CO_3$), and lithium oxide ($Li_2O$).

In the present invention, in the thermal treatment step, after the lithium ion secondary battery finishes combustion (ignition) by heat generation from itself, it is preferable to further thermally treat the lithium ion secondary battery at 750° C. or higher and lower than 1,085° C. by increasing the amount of heat supply again. This additional thermal treatment can melt aluminum that has not melted only by the self-sustained combustion of the lithium ion secondary battery, so it is possible to separate and recover aluminum.

Specifically, when aluminum is contained in the exterior container of the lithium ion secondary battery cell or in any member that constitutes a module or a pack, aluminum can be melted can be recovered through the further thermal treatment at the mentioned thermal treatment temperature. That is, thermally treating a lithium ion secondary battery at 750° C. or higher in the thermal treatment step facilitates sorting (separation) between aluminum contained in the housing of the lithium ion secondary battery and other parts (for example, electrodes) of the lithium ion secondary battery, and recovery of aluminum derived from the housing.

When the positive electrode current collector is aluminum (with a melting point of 660° C.) and the negative electrode current collector is copper (with a melting point of 1,085° C.), for example, the positive electrode current collector formed of an aluminum foil melts and embrittles at a thermal treatment temperature of 750° C. or higher and lower than 1,085° C., and can be readily grained in the pulverizing step described below. On the other hand, the negative electrode current collector formed of a copper foil, which is thermally treated at a temperature lower than the melting point of copper, does not melt. Hence, copper contained in a pulverized product obtained by pulverizing a thermally treated product obtained in the thermal treatment step in the pulverizing step exists in a shape close to a foil even though it is after being pulverized. Therefore, copper can be easily recovered as a coarse-grained product in the classifying step.

<<Storing Container>>

In the present invention, it is preferable to thermally treat a lithium ion secondary battery in the thermal treatment step by placing it in a storing container.

When a lithium ion secondary battery has a high residual voltage when thermally treating the lithium ion secondary battery, the lithium ion secondary battery may undergo a phenomenon called "thermal runaway" depending on, for example, the thermal treatment conditions.

"Thermal runaway" is a phenomenon that "a specific portion inside a battery generates heat due to some cause, and this heat generation induces reactions inside the battery to further induce heat generation, so the entire battery undergoes temperature elevation to induce, for example, heat generation, ignition, and fuming" (for example, see "Events that occur in a safety assessment test for lithium ion secondary batteries (Brief summary of lectures at National Traffic Safety and Environment Laboratory Forum, 135-138, 2012) (https://www.ntsel.go.jp/forum/2012files/pt_21.pdf)"). The identified document raises heating from outside as an example of the cause that drives a lithium ion secondary battery to thermal runaway.

The document also says that "when cells undergo thermal runaway in a chain reaction, it is feared that gases that may be generated may spout at the same timing, and the battery pack may rupture due to a pressure rise inside the battery pack caused by the large quantity of gases.

In addition, "Safety test for lithium ion secondary batteries and analyses on generated gases (Toray Research Center) (https://www.toray-research.co.jp/technical-info/trcnews/pdf/201801-02.pdf)" says that "cells began to expand along with temperature elevation and emitted a white smoke" as a result of a high-temperature heating test on a lithium ion secondary battery in a charged state.

As said in these documents, when a lithium ion secondary battery undergoes thermal runaway, gases generated by the thermal runaway raise the pressure inside the lithium ion secondary battery and may rupture the lithium ion secondary battery.

If a lithium ion secondary battery undergoes thermal runaway and ruptures during a thermal treatment, the body of the burning furnace used for the thermal treatment may be damaged.

Hence, in a preferred embodiment of the present invention, a lithium ion secondary battery is thermally treated in the thermal treatment step, while being placed in a storing container. This makes it possible to control the lithium ion secondary battery (or, for example, the atmosphere surrounding the lithium ion secondary battery or the heating temperature) in a manner that it undergoes temperature elevation more moderately, and to suppress rupture of the lithium ion secondary battery. Moreover, by thermally treating the lithium ion secondary battery by putting it in a storing container, it is possible to suppress damages on the body of the burning furnace used for the thermal treatment even if the lithium ion secondary battery ruptures in the thermal treatment.

The storing container is not particularly limited and may be appropriately selected in accordance with the intended purpose so long as the storing container can contain a lithium ion secondary battery. The exterior container of a lithium ion secondary battery pack or module may be used as it is as the storing container.

The shape of the storing container is not particularly limited and may be appropriately selected in accordance with the intended purpose. A shape that surrounds the lithium ion secondary battery to be thermally treated is preferable as the shape of the storing container.

The size of the storing container is not particularly limited and may be appropriately selected in accordance with the intended purpose so long as the lithium ion secondary battery to be thermally treated can be contained. When thermally treating a plurality of lithium ion secondary batteries collectively, a size that can contain all of the lithium ion secondary batteries that are to be treated is preferable.

It is preferable that the storing container has an opening through which a gas is circulatable. In this case, it is preferable that the storing container contain a lithium ion secondary battery in a manner that a gas does not circulate at any place other than the opening. When the storing container has an opening, it is possible to control the pressure and the atmosphere inside the storing container.

The shape of the opening is not particularly limited and may be appropriately selected in accordance with the intended purpose. The position of the opening on the storing container is not particularly limited and may be appropriately selected in accordance with the intended purpose so long as a gas is circulatable at the position during a thermal treatment. A plurality of openings may be formed in the storing container.

A hole formed in the exterior container of a lithium ion secondary battery pack or module may be used as the opening. A lithium ion secondary battery pack typically has a hole through which a cable or a plug for charging or discharging is connected to a portion inside the pack or module to which electricity is supplied. This hole may be used as the opening.

The size (area) of the opening is not particularly limited, may be appropriately selected in accordance with the intended purpose, and is preferably less than or equal to 12.5% and more preferably less than or equal to 6.3% of the surface area of the storing container. When the size of the opening is less than or equal to 12.5% of the surface area of the storing container, it is possible to suppress oxidization of valuable substances contained in the current collectors during a thermal treatment. In the following description, the area of the opening relative to the surface area of the storing container may be referred to as an "opening ratio". When the storing container has a plurality of openings, the opening ratio may be the total of the areas of the openings relative to the surface area of the storing container.

When the opening ratio of the storing container is in the preferable range described above, the atmosphere inside the storing container during a thermal treatment can become a hypoxic atmosphere, provided that the atmosphere outside the storing container is, for example, the atmospheric atmosphere. Therefore, excessive burning of the lithium ion secondary battery during a thermal treatment can be suppressed, making it possible to suppress thermal runaway of the lithium ion secondary battery and rupture of the lithium ion secondary battery due to the thermal runaway, and to suppress damages on the body of the burning furnace.

As the storing container, one that has an openable and closable lid for storing a lithium ion secondary battery is preferable. This facilitates storing of the lithium ion secondary battery inside the storing container, and removal of the thermally treated lithium ion secondary battery (thermally treated product) after the thermal treatment step.

The lid is not particularly limited and may be appropriately selected in accordance with the intended purpose.

The lid may be secured in an openable and closable manner by, for example, a hinge. Alternatively, the lid may be attached or detached for opening and closing.

The material of the storing container is not particularly limited and may be appropriately selected in accordance with the intended purpose. A material having a melting point higher than the thermal treatment temperature (the highest temperature during a thermal treatment) is preferable. That is, in the present invention, it is preferable that the melting point of the storing container be higher than the temperature at which the lithium ion secondary battery is thermally treated. In this case, it is possible to prevent embrittlement and melting of the storing container during a thermal treatment.

Specific examples of the material of the storing container include iron and stainless steel. For example, when the thermal treatment temperature is 660° C. or higher and lower than 1,085° C., use of a storing container formed of iron or stainless steel having a melting point higher than the thermal treatment temperature can prevent embrittlement and melting of the storing container during the thermal treatment.

In the present invention, it is preferable to perform a thermal treatment in a manner that a flame for thermally treating a lithium ion secondary battery does not contact the storing container. That is, in the present invention, when a fuel is sued in a thermal treatment, it is preferable to perform the thermal treatment by not bringing a flame into a direct contact with the storing container but by heating a gas around the storing container. This makes it possible to prevent rupture of the lithium ion secondary battery in the storing container due to thermal runaway of the lithium ion secondary battery.

The specific method for performing a thermal treatment in a manner that a flame for thermally a lithium ion secondary battery does not contact the storing container is not particularly limited and may be appropriately selected in accordance with the intended purpose. It is preferable to perform the thermal treatment in a manner that the flame is not radiated in a direction toward the storing container. In other words, in the present invention, it is preferable to perform the thermal treatment in the thermal treatment step in a manner that the flame for thermally treating the lithium ion secondary battery is not radiated in a direction toward the storing container.

<Pulverizing Step>

The pulverizing step is a step of pulverizing a thermally treated product (a product obtained by thermally treating a lithium ion secondary battery), to obtain a pulverized product.

The pulverizing steps is not particularly limited and may be appropriately selected in accordance with the intended purpose so long as it is a step of pulverizing a thermally treated product (a roasted product) to obtain a pulverized product. A pulverized product represents a product obtained by pulverizing a thermally treated product.

For example, it is preferable that the pulverizing step be a step of pulverizing a thermally treated product by an impact, to obtain a pulverized product. When the exterior container of the lithium ion secondary battery (including the exterior case of a lithium ion secondary battery pack or module) does not melt in the thermal treatment, it is more preferable to perform a preparatory pulverization, in which a thermally treated product is cut with a cutting device, before applying an impact to the thermally treated product.

Examples of the pulverizing method by an impact include a method of throwing the thermally treated product using a rotating beating board and slamming the thermally treated product against an impact board to apply an impact, and a method of beating the thermally treated product using a rotating beater. The method can be performed with, for example, a hammer crusher.

Other examples of the pulverizing method by an impact include a method of beating the thermally treated product using a ball formed of, for example, ceramic. The method can be performed with, for example, a ball mill. Pulverization by an impact may also be performed using, for example, a biaxial crusher configured to perform pulverization by compression and having a short width of cut and a short blade length.

Examples of the pulverizing method by an impact also include a method of beating the thermally treated product with two rotating chains to apply an impact. This method can be performed with a chain mill.

By pulverization of the thermally treated product by an impact, the positive electrode current collector (for example, aluminum) is pulverized, whereas the negative electrode current collector (for example, copper) that does not significantly change in the form exists in the form of, for example, a foil. Therefore, in the pulverizing step, the negative electrode current collector does not go beyond being cut. Hence, it is possible to obtain a pulverized product in which valuable substances derived from the positive electrode current collector (for example, aluminum) and valuable substances derived from the negative electrode current collector (for example, copper) can be efficiently separated from each other in the classifying step described below.

The pulverization time in the pulverizing step is not particularly limited and may be appropriately selected in accordance with the intended purpose. The pulverization time per 1 kg of a lithium ion secondary battery is preferably 1 second or longer and 30 minutes or shorter, more preferably 2 seconds or longer and 10 minutes or shorter, and particularly preferably 3 seconds or longer and 5 minutes or shorter.

In the present invention, when a lithium ion secondary battery generates heat from itself in a thermal treatment, the lithium ion secondary battery continues combustion even after heating of the lithium ion secondary battery in the thermal treatment is completed. Hence, it is preferable to perform pulverization after the lithium ion secondary battery finishes combustion.

<Classifying Step>

The classifying step is a step of classifying a pulverized product, to obtain a coarse-grained product and a fine-grained product.

The classifying step is not particularly limited and may be appropriately selected in accordance with the intended purpose so long as it is a step of classifying a pulverized product to obtain a coarse-grained product (oversize product) and a fine-grained product (undersize product).

The classifying method is not particularly limited and may be appropriately selected in accordance with the intended purpose. For example, a vibrating sieve, a multi-stage vibrating sieve, a cyclone, and a JIS Z8801 standard sieve may be used for classification. By classification, for example, copper, iron, and aluminum can be separated into the coarse-grained product, and lithium can be concentrated in the fine-grained product.

The particle size (classification point or mesh size of a sieve) for classification is not particularly limited and may be appropriately selected in accordance with the intended purpose. When classification is intended to separate, for example, copper, iron, and aluminum into the coarse-grained product, and to concentrate, for example, lithium, cobalt, and nickel in the fine-grained product, the particle size for classification is preferably 0.6 mm or greater and 2.4 mm or less, and more preferably 0.85 mm or greater and 1.7 mm or less. When the particle size for classification is 2.4 mm or less, it is possible to suppress inclusion of, for example, copper, iron, and aluminum into the fine-grained product. When the particle size for classification is 0.6 mm or greater, it is possible to suppress inclusion of, for example, lithium, cobalt, and nickel into the coarse-grained product.

When a sieve is used as the classifying method, classification performed by placing a loosening-promoting object such as stainless-steel balls or alumina balls on the sieve in order to separate small pulverized products adhering to large pulverized products from the large pulverized products enables more efficient separation between the large pulverized products and the small pulverized products. This can better improve the grades of the metals to be recovered.

The pulverizing step and the classifying step may be performed simultaneously. For example, these steps may be performed as a pulverizing/classifying step (pulverization/classification) of pulverizing a thermally treated product obtained in the thermal treatment step while classifying an obtained pulverized product into a coarse-grained product and a fine-grained product.

Classification into a coarse-grained product and a fine-grained product may be repeated a plurality of times. Classification performed a plurality of times can even more reduce the impurity grade in each product.

<Lithium Recovering Step>

The lithium recovering step of the method for recovering lithium of the present invention is a step of recovering lithium from, for example a pulverized product. The lithium recovering step is not particularly limited and may be appropriately selected in accordance with the intended purpose so long as lithium can be recovered from, for example, a pulverized product, a fine-grained product, a leaching liquid containing lithium, and a solution containing lithium.

In the present invention, it is preferable to immerse a pulverized product or a fine-grained product in water, to thereby obtain a leaching liquid containing lithium (or leach lithium into a leaching liquid and recover lithium) in the lithium recovering step. In other words, in the present invention, it is preferable that the lithium recovering step include a leaching step of immersing a pulverized product or a fine-grained product in water, to thereby obtain a leaching liquid containing lithium.

The leaching step is not particularly limited and may be appropriately selected in accordance with the intended purpose so long as it is a step in which a leaching liquid can be obtained by immersion (dipping or putting into water) of a pulverized product pulverized in the pulverizing step or a fine-grained product recovered in the classifying step in water and consequent leaching of lithium into water. In the leaching step, it is preferable to immerse a fine-grained product recovered in the classifying step in water.

The leaching liquid is typically a slurried liquid (suspension).

The water into which a pulverized product or a fine-grained product is leached is not particularly limited and may be appropriately selected in accordance with the intended purpose. Examples of water include industrial water, tap water, pure water such as ion-exchanged water, ultrafiltrated water, reverse osmotic water, and distilled water, and ultrapure water.

For example, by immersing a pulverized product or a fine-grained product containing lithium oxide ($Li_2O$) or lithium carbonate ($Li_2CO_3$) in water, it is possible to leach lithium into water in the form of lithium hydroxide (LiOH) or lithium carbonate ($Li_2CO_3$) and recover lithium highly efficiently.

The leaching method in the leaching step is not particularly limited and may be appropriately selected in accordance with the intended purpose. Examples of the leaching method include a method of simply leaving a pulverized product or a fine-grained product in water, a method of supplying a pulverized product or a fine-grained product into water and stirring the resultant, a method of supplying a pulverized product or a fine-grained product into water and gently stirring the resultant by applying ultrasonic waves, and a method of showering a pulverized product or a fine-grained product with water. As the leaching method, for example, the method of supplying a pulverized product or a fine-grained product into water and stirring the resultant is preferable.

The water stirring speed in the leaching step is not particularly limited, may be appropriately selected in accordance with the intended purpose, and may be, for example, 200 rpm.

The leaching time in the leaching step is not particularly limited, may be appropriately selected in accordance with the intended purpose, and may be, for example, 1 hour.

<Wet Magnetic Sorting Step>

In the present invention, it is optional to subject a leaching liquid to wet magnetic sorting (wet magnetic force sorting) after the leaching step. By wet magnetic sorting, it is possible to recover components derived from the positive electrode active substance such as cobalt, nickel, and manganese, and components derived from members of a lithium ion secondary battery and having magnetism such as iron. This is effective also in terms of reducing the load in a subsequent filtration step.

That is, in the present invention, it is preferable to sort a leaching liquid into a slurry containing lithium and non-magnetically attractable materials, and magnetically attractable materials containing either or both of cobalt and nickel by subjecting the leaching liquid to wet magnetic sorting in the lithium recovering step.

<Solid-Liquid Separation Step>

In the present invention, it is preferable to filtrate a leaching liquid containing lithium in the lithium recovering step, in order to perform solid-liquid separation of the leaching liquid into a solution containing lithium, and a residue (to recover lithium into the solution). In other words, in the present invention, it is preferable that the lithium recovering step include a solid-liquid separation step of filtrating the leaching liquid containing lithium, in order to perform solid-liquid separation of the leaching liquid into a solution containing lithium, and a residue.

In the present invention, when a leaching liquid is subjected to the wet magnetic sorting, it is preferable to filtrate a slurry obtained by the wet magnetic sorting, to perform solid-liquid separation of the slurry into a solution containing lithium, and a residue containing non-magnetically attractable materials.

By including the solid-liquid separation step, the present invention can recover almost all masses (100%) of nickel and cobalt contained in the leaching liquid as the residue, and separate lithium contained in the leaching liquid into the solution.

The solid-liquid separation method is not particularly limited and may be appropriately selected in accordance with the intended purpose. A method of performing solid-liquid separation of a slurried lithium-leached liquid using, for example, filter paper or a filter press is preferable.

<Fluorine Removing Step>

The method for recovering lithium of the present invention may further include a fluorine removing step of removing fluorine ions contained in the solution containing lithium after the solid-liquid separation step described above. Hence, for example, it is possible to crystallize lithium carbonate having a reduced grade of fluorine, which is an impurity, from the lithium solution that has been through the fluorine removing step.

For removing fluorine from a lithium-containing solution, for example, calcium hydroxide (slaked lime) may be used. Using calcium hydroxide, it is possible to solidify fluorine contained in the solution in the form of calcium fluoride, and to remove fluorine by solid-liquid separation. That is, in the present invention, it is preferable to add calcium hydroxide to the solution in the lithium recovering step to solidify fluorine contained in the solution in the form of calcium fluoride, and subsequently filtrate the solution for solid-liquid separation, to thereby remove fluorine from the solution.

When calcium hydroxide is added to the lithium-containing solution, fluorine and calcium ions form calcium fluoride, which can be removed by solid-liquid separation. Moreover, because calcium ions can be easily removed by addition of carbon dioxide as described below, impurities contained in the lithium-containing solution (lithium solution) can be more decreased.

When adding calcium hydroxide to the lithium solution, it is optional whether to add calcium hydroxide directly, or to add, for example, a compound containing calcium hydroxide.

When adding calcium hydroxide directly, for example, a solid formed of calcium hydroxide may be added, or a solution in which calcium hydroxide is dissolved may be added.

Of these methods, the method of adding a solution in which calcium hydroxide is dissolved is preferred in terms of the fluorine removing efficiency. By adding a solution in which calcium hydroxide is dissolved, it is possible to add calcium hydroxide in a previously ionized state to the lithium solution, and to increase the efficiency of a reaction with fluorine.

In other words, the following problems that may occur when calcium hydroxide in a solid form is added can be prevented. That is, a reaction between dissolved components present in the lithium solution such as carbonate ions ($CO_3^{2-}$) and the surface of the solid containing calcium hydroxide, and consequent formation of a non-fluorine reacted phase on the surface of the solid can be prevented. For example, when slaked lime in a solid form is added, the surface of the slaked lime and the dissolved carbonate ions ($CO_3^{2-}$) present in the lithium solution react with each other, to form a calcium carbonate phase and degrade the fluorine removing efficiency.

The addition amount of calcium hydroxide relative to the total amount of the lithium solution is preferably an amount that allows calcium hydroxide to react with both of fluorine and carbonate ions contained in the lithium solution. For example, the addition amount of calcium hydroxide relative to X moles (mol) of fluorine and Y moles (mol) of carbonate ions contained in the lithium solution is preferably $0.5\times(X+2Y)$ mol or greater and $10\times(X+2Y)$ mol or less and more preferably $0.75\times(X+2Y)$ mol or greater and $5\times(X+2Y)$ mol or less.

It is preferable to stir the lithium solution after adding calcium hydroxide.

The lithium solution stirring speed is not particularly limited, may be appropriately selected in accordance with the intended purpose, and, for example, is preferably 20 rpm or higher and 2,000 rpm or lower and more preferably 50 rpm or higher and 1,000 rpm or lower.

The lithium solution stirring time is not particularly limited, may be appropriately selected in accordance with the intended purpose, and is, for example, preferably 5 minutes or longer and 240 minutes or shorter and more preferably 15 minutes or longer and 120 minutes or shorter. When the stirring time (reaction time) is 240 minutes or shorter, it is possible to prevent re-dissolution of solidified fluorine.

In an embodiment of the present invention, by adjusting the lithium concentration during leaching of lithium into water, it is possible to adjust pH of the lithium solution to 10.5 or higher. This is considered attributable to transformation of the lithium solution to a lithium hydroxide solution. By increasing pH during leaching, it is possible to save the addition amount of an alkali for increasing pH to 12 or higher after calcium hydroxide is added. When pH of the lithium solution after calcium hydroxide is added is lower than 12, it is preferable to additionally add an alkali to adjust pH to 12 or higher. Adjustment of pH may be only by addition of calcium hydroxide.

Under this condition, the amount of dissolved calcium ions ($Ca^{2+}$) can be suppressed to lower than 2,000 mg/L, considering the solubility product of calcium. Hence, it is possible to save the addition amount of a component (for example, carbon dioxide) for removing calcium ions ($Ca^{2+}$).

Even though the calcium ion concentration is at the mentioned low level of 2,000 mg/L, removal of fluorine from the lithium-containing solution is suitably effected.

Moreover, in the present invention, it is preferable to solidify calcium ions, which are from calcium hydroxide added to the lithium solution for removing fluorine, in the form of calcium carbonate by adding carbon dioxide to the lithium solution, and to thereby remove calcium ions by solid-liquid separation. That is, in the present invention, in the lithium recovering step, it is preferable to add carbon dioxide to the solution from which fluorine has been removed, to solidify calcium contained in the solution in the form of calcium carbonate, and subsequently filtrate the solution to perform solid-liquid separation, to thereby remove calcium from the solution.

Moreover, when pH of the lithium solution is high (for example, 10.5 or higher), carbon dioxide can be absorbed and kept in the lithium solution efficiently in the form of $CO_3^{2-}$ ions, and any $CO_3^{2-}$ ions that have not contributed to removing a second component in a second removing step can be effectively used as a component ($CO_3$) for subsequent crystallization of lithium carbonate.

By, for example, evaporative concentration, lithium carbonate having a grade of 99% or higher can be recovered from the liquid from which calcium ions have been removed.

The method for adding carbon dioxide to the lithium solution is not particularly limited and may be appropriately selected in accordance with the intended purpose. Examples of the method include a method of supplying (diffusing) a carbon dioxide-containing gas to the liquid solution, and a method of adding a solid formed of carbon dioxide to the lithium solution. Of these methods, the method of supplying (diffusing) a carbon dioxide-containing gas to the liquid solution is preferable because it is possible to do without adding an impurity to the solution.

Examples of the carbon dioxide-containing gas include a carbon dioxide gas, and air, which is a gas containing $CO_2$. Of these gases, the carbon dioxide gas is preferable. In other words, it is preferable to add a carbon dioxide gas, which contains carbon dioxide as carbon dioxide, to the lithium solution. In this way, it is possible to control the amount of carbon dioxide to be added to the lithium solution easily, and to add carbon dioxide efficiently.

The method for supplying (diffusing) a carbon dioxide-containing gas to the lithium solution is not particularly limited and may be appropriately selected in accordance with the intended purpose. For example, it is possible to use a 20 Å vinyl chloride tube (a hard polyvinyl chloride tube) having twenty holes each having a diameter of 5 mm. Moreover, it is possible to supply (diffuse) a carbon dioxide-containing gas to the lithium solution, by, for example, using a publicly known diffuser used at, for example, a clean water or sewage treatment plant, a wastewater treatment plant, or a large-scale water purifying tank, or by supplying a carbon dioxide-containing gas through a nozzle having a diameter of 1 mm or greater and dispersing the gas using a stirring blade attached above the nozzle.

The supplying conditions for supplying (diffusing) a carbon dioxide-containing gas to the lithium solution is not particularly limited and may be appropriately selected in accordance with the intended purpose. When using a carbon dioxide gas as the carbon dioxide-containing gas, it is optional to supply the carbon dioxide gas by diffusing it at a rate of 25 L/minute for 30 minutes.

In addition, for example, it is preferable to supply carbon dioxide in a manner that the total amount of calcium hydroxide remaining in the lithium solution can be removed.

<Concentration Step (Crystallizing Step)>

The method for recovering lithium of the present invention may further include a concentration step of concentrating lithium contained in the solution after the solid-liquid separation step or the fluorine removing step described above. With this step, for example, it is possible to make lithium contained in the solution readily crystallizable in the form of lithium carbonate.

The concentration method in the concentration step is not particularly limited and may be appropriately selected in accordance with the intended purpose. Examples of the concentration method include evaporative concentration, concentration by membrane separation, and vacuum concentration. Evaporative concentration is preferable because it is possible to save costs by, for example, utilizing plant waste heat, and also because it is possible to effect crystallization of lithium carbonate by heating described below simultaneously during evaporative concentration and to simplify the process. It is desirable to concentrate lithium until the lithium concentration in the liquid becomes 1,500 mg/L or higher.

In the method for recovering lithium of the present invention, it is preferable to add carbon dioxide ($CO_2$) to the lithium-containing solution in the concentration step. This makes it easier for lithium carbonate in the lithium-containing solution to precipitate, and makes lithium carbonate precipitate faster than lithium bound with other impurities (for example, fluorine) (i.e., for example, lithium fluoride). Therefore, it is possible to recover lithium carbonate having a higher grade.

The method for adding carbon dioxide to the lithium-containing solution is not particularly limited and may be appropriately selected in accordance with the intended purpose. It is preferable to add carbon dioxide by blowing the lithium-containing solution with a carbon dioxide gas. The carbonate ion concentration in the lithium-containing liquid after carbon dioxide is supplied is preferably 3,000 mg/L or higher and more preferably 6,000 mg/L or higher.

The concentration magnification for evaporative concentration of the lithium-containing solution is not particularly limited, may be appropriately selected in accordance with the intended purpose, and is preferably higher than or equal to 1.5 times but lower than or equal to 70 times and more preferably higher than or equal to 2 times but lower than or equal to 35 times.

The temperature of the lithium-containing solution during evaporative concentration of the solution is not particularly limited, may be appropriately selected in accordance with the intended purpose so long as the lithium-containing solution can be evaporated at the temperature, and is preferably, for example, 60° C. or higher and 105° C. or lower.

The method for recovering lithium from the leaching liquid or the solution is not particularly limited and may be appropriately selected in accordance with the intended purpose. It is preferable to recover lithium by heating the leaching liquid or the solution. It is more preferable to recover lithium in the form of lithium carbonate by heating the solution. That is, in the present invention, in the lithium recovering step, it is preferable to recover lithium carbonate by heating the solution from which calcium has been removed.

For example, when the lithium-containing solution is heated and the temperature thereof is elevated, the solubility of lithium in the solution decreases. Hence, by precipitating lithium that can no longer be kept dissolved in the solution, it is possible to recover lithium easily.

The precipitated lithium (lithium carbonate) can be recovered with a publicly known tool such as a spoon, a rake, and a scraper. Moreover, by further subjecting lithium carbonate recovered with the publicly known tool such as a spoon, a rake, and a scraper to solid-liquid separation and thereby reducing adherent moisture, it is possible to reduce the grades of impurities in lithium carbonate.

The method for heating the leaching liquid or the solution is not particularly limited and may be appropriately selected in accordance with the intended purpose. Examples of the method include a heating method using a publicly known heater.

For example, the temperature of the lithium-containing solution when heating the solution to precipitate lithium is not particularly limited and may be appropriately selected in accordance with the intended purpose so long as lithium can be precipitated at the temperature, and is, for example, preferably 60° C. or higher and 105° C. or lower.

<Other Steps>

The other steps are not particularly limited and may be appropriately selected in accordance with the intended purpose. Examples of the other steps include a dry magnetic sorting step.

<<Dry Magnetic Sorting Step>>

The present invention may further include, after the classifying step, a dry magnetic sorting step of subjecting the coarse-grained product to dry magnetic sorting (dry magnetic force sorting), to thereby sort the coarse-grained product into magnetically attractable materials and non-magnetically attractable materials.

The dry magnetic sorting step is not particularly limited and may be appropriately selected in accordance with the intended purpose so long as it is a step through which the coarse-grained product can be sorted into magnetically attractable materials and non-magnetically attractable materials.

In the present invention, for example, it is preferable to recover copper (copper concentrate) into non-magnetically attractable materials by subjecting the coarse-grained product to dry magnetic sorting (dry magnetic force sorting). Copper in the negative electrode current collector is coated with carbon, which is bound thereto by a binder. For example, the binder decomposes through self-sustained combustion of the lithium ion secondary battery utilizing the residual voltage of the lithium ion secondary battery. Therefore, high-grade copper having a reduced carbon grade can be recovered into non-magnetically attractable materials.

The dry magnetic sorting step may be performed using, for example, a publicly known magnetic sorter (magnetic force sorter).

The magnetic sorter that can be used in the present invention is not particularly limited and may be appropriately selected in accordance with the intended purpose. Examples of the magnetic sorter include a bar magnet, a hand magnet, a lattice magnet, a rotary magnet, a magnet strainer, a high magnetic force pulley (magnet pulley) magnetic sorter, and a suspended magnetic sorter.

The magnetic force in the dry magnetic sorting step may be appropriately selected in accordance with the sorting target. For example, when sorting iron, the magnetic force is preferably 0.01 T (tesla) or higher and 0.3 T or lower. When sorting stainless steel, a magnetic force higher than the range described above may be used. Different magnetic forces may be combined and used in multiple stages.

In this way, the method for recovering valuable resources of the present invention can selectively recover magnetically attractable materials such as iron and stainless steel, and non-magnetically attractable materials such as coper.

Next, the method for processing a lithium ion secondary battery of the present invention will be described below.

<Thermal Treatment Step>

The method for processing a lithium ion secondary battery of the present invention includes a thermal treatment step of thermally treating a lithium ion secondary battery having a residual voltage higher than or equal to 80% of a rated voltage, to thereby obtain a thermally treated product.

The details of the thermal treatment step of the method for processing a lithium ion secondary battery of the present invention may be the same as the details of the thermal treatment step of the method for recovering lithium of the present invention.

That is, in the method for processing a lithium ion secondary battery of the present invention, it is preferable to thermally treat a lithium ion secondary battery at 350° C. or higher and 550° C. or lower in the thermal treatment step, to thereby induce combustion (self-sustained combustion) and ignition of the lithium ion secondary battery by heat generation from itself. This makes it possible to thermally decompose a binder resin and the electrolytic solution of the lithium ion secondary battery efficiently, and to facilitate recovery of valuable substances such as copper, aluminum, cobalt, and nickel from the lithium ion secondary battery. Moreover, for example, the method for processing a lithium ion secondary battery of the present invention can process a lithium ion secondary battery utilizing energy derived from the voltage of the lithium ion secondary battery while suppressing thermal runaway of the lithium ion secondary battery. Hence, it is possible to deactivate the lithium ion secondary battery (e.g., discharge the lithium ion secondary battery and remove the electrolytic solution from the lithium ion secondary battery) stably while suppressing generation of, for example, a toxic gas, and to save the energy needed for the process.

In the method for processing a lithium ion secondary battery of the present invention, it is preferable to thermally treat a lithium ion secondary battery by putting it in a storing container in the thermal treatment step, as in the method for recovering lithium of the present invention. The details of the storing container may be the same as the storing container of the method for recovering lithium of the present invention.

Moreover, in the method for processing a lithium ion secondary battery of the present invention, it is preferable to perform a thermal treatment in a manner that a flame for thermally treating a lithium ion secondary battery is not radiated in a direction toward the storing container, so that the flame may not contact the storing container, as in the method for recovering lithium of the present invention. This makes it possible to prevent a sharp temperature rise of the lithium ion secondary battery, and to facilitate safer recovery of valuable substances as a result.

In the method for processing a lithium ion secondary battery of the present invention, it is preferable that a lithium ion secondary battery include an exterior case (housing) containing aluminum, and it is preferable to melt the exterior case to thereby recover aluminum in the thermal treatment step performed after the lithium ion secondary battery finishes combustion (self-sustained combustion) by heat generation from itself, as in the method for recovering lithium of the present invention. Specifically, for example, by thermally treating a lithium ion secondary battery at 750° C. or higher in the thermal treatment step performed after the lithium ion secondary battery finishes combustion (self-sustained combustion) by heat generation from itself, it is possible to sort (separate) aluminum contained in the exterior case (housing) of the lithium ion secondary battery and other parts (for example, electrodes) of the lithium ion secondary battery from each other easily, and to recover aluminum derived from the housing easily.

Moreover, in this case, it is preferable to facilitate easier recovery of melted aluminum by, for example, thermally treating the lithium ion secondary battery by placing it on a net, or by thermally treating the lithium ion secondary battery by placing it on a groove (slit). For example, the storing container may have such a net or a groove.

As described above, the method for processing a lithium ion secondary battery of the present invention can process a lithium ion secondary battery and render it harmless safely, easily, at low costs, and can process the lithium ion secondary battery without, for example, rupture of the lithium ion secondary battery due to thermal runaway thereof and consequent damages of the furnace used for the thermal treatment.

Rupture of a lithium ion secondary battery due to thermal runaway thereof tends to occur when a positive electrode active substance having a high nickel ratio, such as an NCA system or NCM811, in which Ni among Ni, Co, Mn, and Al accounts for 75% or greater by weight, is thermally treated. Hence, the present invention can thermally treat even a lithium ion secondary battery containing a positive electrode active substance having a nickel ratio of 75% or higher in a favorable manner.

<Pulverizing Step and Classifying Step>

It is preferable that the method for processing a lithium ion secondary battery of the present invention include a pulverizing step of pulverizing a thermally treated product to obtain a pulverized product, and a classifying step of classifying the pulverized product to obtain a coarse-grained product and a fine-grained product.

The details of the pulverizing step and the classifying step of the method for processing a lithium ion secondary battery of the present invention may be the same as the details of the pulverizing step and the classifying step of the method for recovering lithium of the present invention.

In the method for processing a lithium ion secondary battery of the present invention, it is preferable to recover copper into the coarse-grained product in the classifying step. Here, copper in the negative electrode current collector is coated with carbon, and carbon is bound thereto by a binder, as described above. For example, the binder decomposes through self-sustained combustion of the lithium ion secondary battery utilizing the residual voltage of the lithium ion secondary battery. Hence, by subjecting the coarse-grained product to dry magnetic sorting, it is possible to recover high-grade copper having a reduced carbon grade into non-magnetically attractable materials.

<Leaching Step and Wet Magnetic Sorting Step>

It is preferable that the method for processing a lithium ion secondary battery of the present invention further include a leaching step of immersing the fine-grained product in water to obtain a leaching liquid containing lithium, and a wet magnetic sorting step of subjecting the leaching liquid to wet magnetic sorting to sort the leaching liquid into a slurry containing lithium and non-magnetically attractable materials, and magnetically attractable materials containing either or both of cobalt and nickel.

The details of the leaching step and the wet magnetic sorting step of the method for processing a lithium ion secondary battery of the present invention may be the same as the details of the leaching step and the wet magnetic sorting step of the method for recovering lithium of the present invention.

In the method of processing a lithium ion secondary battery of the present invention, it is possible to metalate cobalt and nickel (i.e., to improve their magnetic attractability) by inducing combustion (self-sustained combustion) of a lithium ion secondary battery by heat generation from itself in the thermal treatment step. Hence, by performing wet magnetic sorting, the method for processing a lithium ion secondary battery of the present invention can recover cobalt and nickel metals as magnetically attractable materials at high recovery rates with high grades.

<Other Steps>

Other steps are not particularly limited and may be appropriately selected in accordance with the intended purpose.

First Embodiment

An example of an embodiment of the method for recovering lithium of the present invention will be described with reference to the drawing. FIG. 1 is a diagram illustrating an example of the flow of processes according to an embodiment of the method for recovering lithium of the present invention.

In the first embodiment, a lithium ion secondary battery (LIB) in a state of having a residual voltage higher than or equal to 80% of a rated voltage (i.e., in an undischarged state) is thermally treated (thermal treatment step), to obtain a LIB thermally treated product. In the thermal treatment, the electric energy in the lithium ion secondary battery can be utilized for the thermal treatment. By performing the thermal treatment at a temperature higher than or equal to the melting point of aluminum, it is possible to melt and separate aluminum (Al) of the LIB.

Next, in the first embodiment, the LIB thermally treated product is pulverized and classified (pulverizing step and classifying step), to obtain a coarse-grained product and a fine-grained product. Here, for example, copper (Cu) and iron (Fe) can be separated as the coarse-grained product.

Next, in the first embodiment, the fine-grained product is immersed in water, to obtain a slurry-like leaching liquid. Here, lithium (lithium oxide or lithium carbonate) is leached into water, and a residue containing nickel (Ni), cobalt (Co), and manganese (Mn) is formed in the leaching liquid.

A lithium ion secondary battery in a state of having a residual voltage higher than equal to 80% of a rated voltage (in an undischarged state) is present in a thermodynamically unstable state as represented by, for example, $Li_xC$ or $Li_{(1-x)}CoO_2$ ($0<x\leq1$) as described above. Therefore, by the thermal treatment, these substances can be easily transformed to lithium substances that can dissolve in water, such as lithium fluoride (LiF), lithium carbonate ($Li_2CO_3$), and lithium oxide ($Li_2O$). Consequently, it is possible to improve the recovery rate (leaching rate) of lithium into the leaching liquid.

Then, by removing the residue containing nickel (Ni), cobalt (Co), and manganese (Mn) from the liquid into which lithium has leached by solid-liquid separation, it is possible to obtain a solution in which lithium has leached.

EXAMPLES

The present invention will be described below by way of Examples. The present invention should not be construed as being limited to these Examples.

Example 1

<Thermal Treatment>

First, lithium ion secondary batteries with a total weight of 400 kg (with an average Ni ratio of 75% in the amounts of Co, Ni, Mn, and Al in the positive electrode active substance, with a residual voltage of 100%) were put in a SUS304 storing container having a width of 2,350 mm, a depth of 1,650 mm, a height of 400 mm, and a plate thickness of 4 mm. This container was disposed in the center of a furnace having an internal furnace width of 3,050 mm, a depth of 8,950 mm, and a height of 3,940 mm. The temperature in the furnace was measured with a thermocouple installed on the wall surface of an exhaust gas outlet formed in an upper portion in the furnace.

The lid of this storing container had an opening having a diameter of 500 mm in the center, and the bottom surface of the storing container had a slit (groove) that had a width of 30 mm and into which melted aluminum would be recovered. A thermocouple was disposed on the upper and lower surfaces of the lithium ion secondary batteries in the storing container, and the temperature of the body of the lithium ion secondary battery pack was measured during a thermal temperature described below.

Next, kerosene in a total of four burners including two kerosene burners disposed on both sides at a distance of 1,000 mm from the entrance opening of the furnace and two kerosene burners disposed on both sides at a distance of 7,950 mm from the entrance opening of the furnace was burned, to internally warm the furnace and perform a thermal treatment in a manner that the flames of the burners would not contact the storing container. That is, in Example 1, the thermal treatment was performed in a manner that the flames for thermally treating the lithium ion secondary batteries were not radiated in the direction toward the storing container.

In the thermal treatment using the flames of the burners, first, the temperature in the furnace was elevated from about 20° C. to 400° C. in 1 hour. When the temperature in the furnace had been retained at 400° C. for 1 hour, it was confirmed from an image captured by a camera inside the furnace that flames broke out from the opening of the storing container and from the gap between the lid and the body, and that the lithium ion secondary batteries inside the storing container started spontaneous combustion (self-sustained combustion). Then, after the spontaneous combustion of the lithium ion secondary batteries was confirmed, the supply amount of kerosene to be used for the burners was decreased to 20% of the supply amount (100%) of kerosene used for retaining the temperature in the furnace at 400° C.

The ignition of the lithium ion secondary batteries by spontaneous combustion (self-sustained combustion) continued for 30 minutes, and the temperature of the lithium ion secondary batteries went up to 800° C. at the maximum from 430° C., which was the temperature immediately before the spontaneous combustion. After the lithium ion secondary batteries finished the spontaneous combustion (after flames from the storing container were no longer observed), the burning operations of all of the burners were stopped, to release heat for 1 hour. Subsequently, the storing container was taken out from the furnace, and the lithium ion secondary batteries (after being thermally treated) inside and aluminum recovered into the slit in the bottom of the storing container were recovered.

<Pulverization and Classification>

Next, using a hammer crasher (MAKINO-TYPE SWING HAMMER CRUSHER HC-20-3.7, obtained from Makino Mfg. Co., Ltd.) as a pulverizer, the thermally treated lithium ion secondary batteries (thermally treated product of the lithium ion secondary batteries) were pulverized at 50 Hz (at a hammer circumferential speed of 38 m/s) with a punching metal hole diameter of 10 mm at the outlet, to obtain a pulverized product of the lithium ion secondary batteries.

Next, using a sieve having a mesh size (classification point) of 1.2 mm (with a diameter of 200 mm, obtained from Tokyo Screen Co., Ltd.), the pulverized product of the lithium ion secondary batteries was sieved (classified). After sieving, the oversize product (coarse-grained product) and the undersize product (fine-grained product) above and below the 1.2 mm sieve were harvested, respectively.

<Dry Magnetic Sorting of Coarse-Grained Product (Recovery of Copper Concentrate)>

Next, using a drum-shaped dry magnetic sorter (CC 15"φ×20"W, obtained from Eriez Magnetics Japan Co., Ltd.) having a magnetic flux density of 1,500 G (0.15 T), the obtained coarse-grained product was subjected to magnetic sorting (dry magnetic sorting) at a feed rate of 0.5 kg/minute, to recover magnetically attractable materials and non-magnetically attractable materials (copper concentrate) separately.

<Leaching of Fine-Grained Product and Wet Magnetic Sorting>

The fine-grained product (100 kg) obtained by the classification was immersed in water (400 L), to leach lithium into water at a solid-liquid ratio of 25% at a stirring speed of 400 rpm for a leaching time of 1 hour. Using a drum-shaped magnetic sorter (product name: WD L-8 LABORATORY MODEL, obtained from Eriez Magnetics Japan Co., Ltd.), the slurry obtained by leaching lithium into water was subjected to wet magnetic sorting (wet magnetic force sorting) at a magnetic force of 1,500 G at a drum rotation number of 45 rpm at a solid-liquid ratio of 25% at a slurry supplying speed of 100 L/h/min, to recover magnetically attractable materials, and a slurry (200 L) containing non-magnetically attractable materials. The slurry containing non-magnetically attractable materials was subjected to pressure filtration at a pressure of 0.6 MPa with a filter press using a filter cloth (product name: PP934K, obtained from Nakao Filter Media Corp.), to separate the non-magnetically attractable materials by solid-liquid separation and obtain a lithium-leached liquid (lithium-containing solution).

<Removal of Fluorine from Lithium-Leached Liquid>

The obtained lithium-leached liquid (with pH of about 10.5 and a fluorine concentration of 500 mg/L) was prepared in an FRP tank (a manufactured product with a diameter of 1,084 mm and a height of 1,500 mm). While the resultant was being stirred with a stirrer (HP-5006, obtained from HANWAKAKOKI Co., Ltd.), slaked lime (calcium hydroxide) having a slurry concentration of 25% and water were added and reacted with the resultant for 1 hour (formation of calcium fluoride) with adjustment of pH to 12.0. Subsequently, the resultant was subjected to solid-liquid separation by pressure filtration at a pressure of 0.6 MPa with a filter press using a filter cloth (product name: PP934K, obtained from Nakao Filter Media Corp.), to obtain a lithium solution from which fluorine had been removed (fluorine-removed liquid, with a fluorine concentration of 15 mg/L).

<Removal of Calcium from Lithium Solution>

The calcium concentration in the lithium solution (fluorine-removed liquid) was measured. As a result, dissolved calcium (135 mg/L) was present in the lithium solution. To remove the dissolved calcium, a carbon dioxide ($CO_2$) gas was diffused into the lithium solution at 25 L/minute for 30 minutes using a 20 Å vinyl chloride tube (hard polyvinyl chloride tube) having twenty holes each having a diameter of 5 mm, to precipitate the calcium ($Ca^{2+}$ ions) remaining in the lithium solution in the form of calcium carbonate.

The lithium solution in which calcium carbonate was precipitated was subjected to solid-liquid separation by pressure filtration at a pressure of 0.6 MPa with a filter press using a filter cloth (product name: PP934K, obtained from Nakao Filter Media Corp.), to obtain a lithium solution from which calcium had been removed (calcium-removed liquid).

<Crystallization of Lithium Carbonate>

The lithium solution (calcium-removed liquid, 450 L) was prepared first by 200 L in a 250 L SUS304 cylindrical container (a manufactured product with an internal diameter of 650 mm and a height of 1,180 mm), and subsequently continuously supplied thereinto at a rate of 7 L/hour while being stirred at stirring speed of 200 rpm with a stirrer (product name: SUPER AGITATOR, model No. TTF-2V, obtained from Toyoki Corporation). A vapor having a temperature of 158° C. was supplied into a Teflon (registered trademark) tube-type heat exchanger (obtained from Kansetsu Sangyo Co., Ltd., a manufactured product with a heat transfer area of 1.4 $m^2$) installed within the container, for heat exchange of the liquid in a manner that the liquid temperature would be 100° C. and the liquid would be evaporatively concentrated by 5 times at normal pressure (in a manner that the liquid obtained by the evaporative concentration (the liquid containing a lithium carbonate crystallized product) would have a volume of 90 L). The liquid obtained by the evaporative concentration was subjected to pressure filtration at a pressure of 0.6 MPa with a filter press using a filter cloth (product name: PP934K, obtained from Nakao Filter Media Corp.), to obtain a lithium carbonate crystallized product.

Example 2

A thermal treatment was performed in the same manner as in Example 1, except that unlike in Example 1, after lithium ion secondary batteries finished spontaneous combustion, the burning operations of the four burners were resumed to perform an additional thermal treatment by elevating the temperature in the furnace to 800° C. in 1 hour and then retaining the temperature at 800° C. for 1 hour. In Example 2, after this thermal treatment, the burning operations of all of the burners were stopped, to release heat for 1 hour. Subsequently, the storing container was taken out from the furnace, and the lithium ion secondary batteries (after being thermally treated) inside and aluminum recovered into the slit in the bottom of the storing container were recovered.

In Example 2, the processes after the thermal treatment were performed in the same manner as in Example 1, to recover, for example, lithium carbonate.

Example 3

The same processes as in Example 1 were performed, except that unlike in Example 1, a thermal treatment was performed by elevating the temperature in the furnace from about 20° C. to 800° C. (which was 400° C. in Example 1) in 1 hour. In Example 3, ignition from the storing container was observed when the temperature in the furnace reached 700° C. (at which the temperature of the lithium ion secondary batteries was 430° C.). In Example 3, the burning operations of the burners were completely stopped when the ignition from the storing container was observed. Nevertheless, the temperature in the furnace rose from 700° C. to 960° C. in ten minutes. In Example 3, copper foils were embrittled by the rapid burning (oxidization reaction) inside the storing container, to result in a lower recovery rate of copper into the coarse-grained product after pulverization/classification and in a lower leaching rate of lithium into water from the fine-grained product than in Example 1 (47% of those in Example 1), but in a higher recovery rate of lithium (lithium carbonate) than in Comparative Example 1 described below.

Example 4

The same processes as in Example 1 were performed except that unlike in Example 1, the burning operation of one burner that was at a position at which its flame would contact the storing container was started when the temperature in the heating furnace rose to 400° C., to thereby perform a thermal treatment by applying the flame to the storing container. In Example 4, ignition from the storing container was observed three minutes after application of the flame was started (when the temperature of the lithium ion secondary batteries was 430° C.). In Example 4, the burning operation of the burner was completely stopped when the ignition from the storing container was observed. Nevertheless, the temperature in the furnace rose from 400° C. to 920° C. in ten minutes. In Example 4, copper foils were embrittled by the rapid burning (oxidization reaction) inside the storing container, to result in a low recovery rate of copper into the coarse-grained product after pulverization/classification and in a low leaching rate of lithium into water from the fine-grained product (32% of those in Example 1), but in a higher recovery rate of lithium (lithium carbonate) than in Comparative Example 1 described below.

Comparative Example 1

The same processes as in Example 1 were performed except that unlike in Example 1, a thermal treatment was performed after lithium ion secondary batteries were discharged to a residual voltage of 50%. In Comparative Example 1, the lithium ion secondary batteries failed to start ignition (self-sustained combustion), so decomposition of the binder and decomposition of the positive electrode active substance (solubilization of lithium and metalation of cobalt and nickel) did not occur. The lithium ion batteries after being thermally treated were disassembled. As a result, it was confirmed that the surfaces of the separator and the positive electrode and the negative electrode were damp with the electrolytic solution and that detoxification was not perfected.

Hence, in Comparative Example 1, a high-grade copper concentrate was not recovered (copper grade was low), the leaching rate of lithium was low, and the recovery rates of cobalt and nickel into the magnetically attractable materials were low. Moreover, in Comparative Example 1, since the lithium ion secondary batteries failed to start ignition (self-sustained combustion), the amount of kerosene needed until the thermal treatment was completed was higher by 20% than in Example 1.

The recovery rate of each element into each recovered product when the amount of each element contained in the process target lithium ion secondary batteries was seen to be 100% is presented in Table 1.

TABLE 1

| Element | Recovered product | Unit | Ex. 1 | Ex. 2 | Ex. 3 | Ex. 4 | Comp. Ex. 1 |
|---|---|---|---|---|---|---|---|
| Lithium | Lithium carbonate | (%) | 21 | 22 | 10 | 7 | 2 |
| Copper | Non-magnetically attractable materials of dry magnetic sorting | (%) | 85 | 82 | 69 | 56 | 99 |
| Nickel | Magnetically attractable materials of wet magnetic sorting | (%) | 89 | 90 | 85 | 87 | 6 |
| Cobalt | Magnetically attractable materials of wet magnetic sorting | (%) | 90 | 90 | 84 | 88 | 7 |
| Aluminum | Melted product of thermal treatment | (%) | 7 | 76 | 15 | 15 | 0 |

The grade of each element in each recovered product is presented in Table 2.

TABLE 2

| Element | Recovered product | Unit | Ex. 1 | Ex. 2 | Ex. 3 | Ex. 4 | Comp. Ex. 1 |
|---|---|---|---|---|---|---|---|
| Lithium | Lithium carbonate | (wt. %) | 99.3 | 99.2 | 99.1 | 99.2 | 99.1 |
| Copper | Non-magnetically attractable materials of dry magnetic sorting | (wt. %) | 72 | 81 | 54 | 49 | 20 |
| Nickel | Magnetically attractable materials of wet magnetic sorting | (wt. %) | 35 | 34 | 34 | 34 | Not measured |
| Cobalt | Magnetically attractable materials of wet magnetic sorting | (wt. %) | 4 | 4 | 4 | 4 | Not measured |
| Aluminum | Melted product of thermal treatment | (wt. %) | 98 | 99 | 98 | 98 | Not measured |

In all Examples, by putting the lithium ion secondary batteries in the string container, it was possible to prevent damages of the furnace body that may be caused by rupture of the lithium ion secondary batteries. In all Examples, the electrolytic solution was completely removed.

As described above, the method for recovering lithium of the present invention is a method for recovering lithium, for recovering lithium from a lithium ion secondary battery, and includes a thermal treatment step of thermally treating a lithium ion secondary battery having a residual voltage higher than or equal to 80% of a rated voltage, to obtain a thermally treated product, a pulverizing step of pulverizing the thermally treated product to obtain a pulverized product, and a lithium recovering step of recovering lithium from the pulverized product. Hence, the method for recovering lithium of the present invention can do without discharging lithium ion secondary batteries and cut the energy costs in the thermal treatment step, and can recover lithium from lithium ion secondary batteries at a high recovery rate.

The method for processing a lithium ion secondary battery of the present invention includes a thermal treatment step of thermally treating a lithium ion secondary battery having a residual voltage higher than or equal to 80% of a rated voltage, to obtain a thermally treated product. Hence, the method for processing a lithium ion secondary battery of the present invention can do without discharging lithium ion secondary batteries and cut the energy costs in the thermal treatment step, and can process lithium ion secondary batteries and render the lithium ion secondary batteries harmless (for example, remove the electrolytic solution from the lithium ion secondary batteries) safely, easily, at low costs.

The invention claimed is:

1. A method for recovering lithium, for recovering lithium from a lithium ion secondary battery, the method comprising:

thermally treating a lithium ion secondary battery having a residual voltage higher than or equal to 80% of a nominal voltage, to obtain a thermally treated product;

pulverizing the thermally treated product, to obtain a pulverized product; and recovering lithium from the pulverized product; wherein the thermally treating comprises:

heating the lithium ion secondary battery to 350° C. or higher and 430° C. or lower while being placed in a storing container, igniting the lithium ion secondary battery during a first stage of heat supply in which a first amount of heat is supplied to the lithium ion secondary battery, and once the lithium ion secondary battery ignites, starting a second stage of heat supply that supplies a second amount of heat to the lithium ion secondary battery, the second amount of heat being at a level that is less than or equal to 50% of the first amount of heat; wherein the storage container has an opening and an openable and closable lid, where a total area of the opening is less than or equal to 12.5% of the total surface area of the storing container with the proviso that the opening is sized to allow a hypoxic atmosphere to form in the storage container during the thermally treating.

2. The method for recovering lithium according to claim 1, wherein a melting point of the storing container is higher than a temperature at which the lithium ion secondary battery is thermally treated.

3. The method for recovering lithium according to claim 1, wherein in the thermally treating, the lithium ion secondary battery is thermally treated in a manner that a flame for thermally treating the lithium ion secondary battery does not contact the storing container.

4. The method for recovering lithium according to claim 1, comprising after the pulverizing, classifying the pulverized product, to obtain a coarse-grained product and a fine-grained product, wherein in the recovering lithium, lithium is recovered from the fine-grained product.

5. The method for recovering lithium according to claim 1, wherein in the recovering lithium, the pulverized product is immersed in water, to obtain a leaching liquid containing lithium.

6. The method for recovering lithium according to claim 5, wherein in the recovering lithium, the leaching liquid is subjected to wet magnetic sorting, to sort the leaching liquid into a slurry containing lithium and non-magnetically attractable materials, and magnetically attractable materials containing either or both of cobalt and nickel.

7. The method for recovering lithium according to claim 6, wherein in the recovering lithium, the slurry is filtrated, to perform solid-liquid separation of the slurry into a solution containing lithium, and a residue containing the non-magnetically attractable materials.

8. The method for recovering lithium according to claim 7, wherein in the recovering lithium, calcium hydroxide is added to the solution in order that fluorine contained in the solution is solidified in a form of calcium fluoride, and the solution is subsequently filtrated to perform solid-liquid separation to remove fluorine from the solution.

9. The method for recovering lithium according to claim 1, wherein in the thermally treating, after the lithium ion secondary battery finishes igniting, the lithium ion secondary battery is further thermally treated at 750° C. or higher and lower than 1,085° C.

10. A method for recovering lithium, for recovering lithium from a lithium ion secondary battery, the method comprising:

thermally treating a lithium ion secondary battery having a residual voltage higher than or equal to 80% of a nominal voltage, to obtain a thermally treated product;

pulverizing the thermally treated product, to obtain a pulverized product; and recovering lithium from the pulverized product; wherein the thermally treating comprises:

heating the lithium ion secondary battery to 350° C. or higher and 430° C. or lower such that the lithium ion secondary battery begins to ignite, and after the lithium ion secondary battery finishes igniting, the lithium ion secondary battery is further thermally treated at 750° C. or higher and lower than 1,085° C.; wherein in the thermally treating, the lithium ion secondary battery is thermally treated while being placed in a storing container having a plurality of openings, where a total area of each opening of the plurality of openings is less than or equal to 6.3% of a surface area of the storing container.

* * * * *